US009529356B2

(12) United States Patent
Mere et al.

(10) Patent No.: US 9,529,356 B2
(45) Date of Patent: Dec. 27, 2016

(54) DATA MANAGEMENT SYSTEM OF AN AIRCRAFT

(71) Applicant: AIRBUS OPERATIONS (SAS), Toulouse (FR)

(72) Inventors: Jean-Claude Mere, Verfeil (FR); Pierre Neri, Tournefeuille (FR); Julien Bernat, Toulouse (FR); Marc Vie, Labarthe sur Leze (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/553,345

(22) Filed: Nov. 25, 2014

(65) Prior Publication Data
US 2015/0150095 A1    May 28, 2015

(30) Foreign Application Priority Data

| Nov. 26, 2013 | (FR) | 13 61660 |
| Apr. 14, 2014 | (FR) | 14 53296 |
| Jun. 30, 2014 | (FR) | 14 56177 |

(51) Int. Cl.
*H04L 29/00* (2006.01)
*G05D 1/00* (2006.01)
(Continued)

(52) U.S. Cl.
CPC ............... *G05D 1/00* (2013.01); *G01C 21/00* (2013.01); *G01C 23/00* (2013.01); *G05D 1/0202* (2013.01);
(Continued)

(58) Field of Classification Search
CPC .................... G05D 1/00; G09G 5/00
(Continued)

(56) References Cited

U.S. PATENT DOCUMENTS

| 2004/0162648 A1 | 8/2004 | Bontrager et al. |
| 2007/0032921 A1 | 2/2007 | Allen |

(Continued)

FOREIGN PATENT DOCUMENTS

FR    2 935 818    3/2010

OTHER PUBLICATIONS

Search Report for FR 1453296, dated Sep. 26, 2014, 2 pages.
(Continued)

*Primary Examiner* — Anthony Brown
*Assistant Examiner* — Michael D Anderson
(74) *Attorney, Agent, or Firm* — Nixon & Vanderhye P.C.

(57) ABSTRACT

A system to manage transmissions of data between a flight management system (e.g., of an avionics type) of an aircraft and a portable electronic (e.g., of an open world type) is proposed. The data management system may be implemented in flight management system architecture with core and supplementary modules that are distinct from each other. The core module may implement a set of generic functionalities related to a flight management of the aircraft, and the supplementary module may implement supplementary functionalities specific to an entity to which the aircraft belongs. The data management system may comprise a data securing module that monitors data to be transmitted between the flight management system and the portable electronic device, and allows or prevents the data transmission based on the monitoring results.

19 Claims, 4 Drawing Sheets

(51) Int. Cl.
| | |
|---|---|
| *G08G 5/00* | (2006.01) |
| *G05D 1/02* | (2006.01) |
| *G08G 5/06* | (2006.01) |
| *H04L 12/26* | (2006.01) |
| *H04L 29/06* | (2006.01) |
| *H04L 29/08* | (2006.01) |
| *G01C 21/00* | (2006.01) |
| *G01C 23/00* | (2006.01) |
| *G06Q 10/08* | (2012.01) |

(52) U.S. Cl.
CPC ............ *G06Q 10/087* (2013.01); *G08G 5/003* (2013.01); *G08G 5/0021* (2013.01); *G08G 5/0034* (2013.01); *G08G 5/0039* (2013.01); *G08G 5/06* (2013.01); *H04L 43/0823* (2013.01); *H04L 63/08* (2013.01); *H04L 67/12* (2013.01)

(58) Field of Classification Search
USPC .......................................................... 701/3
See application file for complete search history.

(56) References Cited

U.S. PATENT DOCUMENTS

| | | |
|---|---|---|
| 2008/0154440 A1 | 6/2008 | Carlton |
| 2012/0078450 A1 | 3/2012 | Marche et al. |
| 2012/0191273 A1* | 7/2012 | Jacobs ............... H04B 7/18508 701/3 |
| 2012/0265372 A1* | 10/2012 | Hedrick ................. H04L 67/36 701/3 |

OTHER PUBLICATIONS

Search Report for FR 1361660, dated Aug. 6, 2014, 2 pages.
David Gascon, "Security in 802.15.4 and ZigBee Networks", Apr. 28, 2009, pp. 1-5, XP002728592, http:www.libelium.com/security-802-15-4-zigbee/.

* cited by examiner

DATA MANAGEMENT SYSTEM OF AN AIRCRAFT

PRIORITY

This application claims priority to Application No. FR1456177 filed Jun. 30, 2014 and to Application No. FR1453296 filed Apr. 14, 2014, both of which are hereby incorporated by reference in their entirety. This application also claims priority to Application No. FR1361660 filed Nov. 26, 2013, which is hereby incorporated by reference in its entirety.

TECHNICAL FIELD

The technical area of the present invention relates to system(s), method(s) and/or apparatus(es) for managing transmission of data on an aircraft, for example, on a transport airplane.

BACKGROUND

It is known that an Electronic Flight Bag (EFB) device contains applications of the airline and/or data computed by the airline which make it possible, when preparing a flight or during a flight, to enter suitable data into a flight management system (FMS), which is a sensitive electronic system of the aircraft. Security constraints can arise in the transmission of data to the FMS due to security requirements weighing on the FMS. In particular, it is essential to prevent a malicious person in the aircraft from being able to enter data including corrupted codes into the FMS, or to prevent faulty applications from being able to send data which could lead to a malfunction of the FMS. Consequently a conventional EFB device is not designed to transmit data to the FMS.

Also, to prepare a flight, the crew of the aircraft manually copies or enters the data displayed on the screen of the EFB device into the FMS, via a human/machine interface of the aircraft. Such manual loading of data represents a significant workload for the crew, further generating a loss of time and a risk of error.

SUMMARY

The present invention, at least in part, is directed to system(s), method(s) and/or apparatus(es) to enable transmission of data on an aircraft that address one or more shortcomings of conventional ways to manage data transmissions on an aircraft. In one or more aspects, the present invention is directed to system(s), method(s) and/or apparatus(es) to enable efficient and secure exchange of data between a flight management system of an aircraft and a portable electronic device.

An aspect of the present invention may be directed to a data management system for an aircraft. The data management system may be configured to manage data transmissions between a flight management system and at least one portable electronic device. The flight management system may be of an avionics type, i.e., a system that is secured in such a way to obey data constraints (of integrity and of availability). The portable electronic device may be of an open type, i.e., a device that is not sufficiently secured to enable integration in the aircraft. The portable electronic device can be an electronic flight device of EFB (Electronic Flight Bag) type, or any other portable computer or touch tablet, which can be used to prepare a flight of the aircraft.

The data management system may comprise a data link and a data securing module. The data link may be configured to allow a transmission of data between the portable electronic device and the flight management system. The data securing module may be configured to automatically monitor the data to be transmitted between the portable electronic device and the flight management system. The data securing module may also be configured to automatically manage an authorization to transmit the data between the flight management system and the portable electronic device, based on the monitoring. Thus, the data management system may be able to transmit (or transfer), automatically and securely, data from the portable electronic device (e.g., an EFB device) to the flight management system of the aircraft. This reduces the workload of the crew, thus enabling the crew to save time when preparing the aircraft, while being more effective (e.g., by avoiding input errors, etc.).

The data securing module may comprise a switching element suitable for being externally controlled. The switching element may be configured to be brought alternatively into one or the other of two different positions. When brought into a first position, the switching element prevents the transmission of data between the portable electronic device and the flight management system via the data link. When brought into a second position, the switching element allows the transmission of data between the portable electronic device and the flight management system via the data link. The switching element may be either hardware or software type.

The data securing module may also comprise a monitoring unit configured to monitor the data to be transmitted so as to detect whether the data is incorrect data. When incorrect data is detected, the monitoring unit may control the switching element to be brought into the first position. In a context of the present invention, incorrect data can be understood to mean any one or more of the following: an incorrect data flow, data which are not expected (for example in certain flight phases) and/or data to be transmitted after too long a time interval following a corresponding request. The monitoring unit may comprise one or more security applications at least one of which may perform the data monitoring and the switching element controlling based on the monitoring.

In one embodiment, the flight management system may comprise a core module and a supplementary module. The two modules may be distinct from each other. The monitoring unit may be situated on a same equipment item as one of the core and supplementary modules. The monitoring unit may comprise a data acquisition unit and a monitoring partition.

The data management system may further comprises a securing entity. The securing entity may comprise the security application of the monitoring unit as discussed above. The securing entity may also include at least one supplementary security application. The securing entity may be situated on a same equipment item as one the core and supplementary modules. The securing entity may comprise at least one of the following security applications: an incorrect data flow detection application, a data consistency and format checking application, an input checking application, and a data decryption application.

Furthermore, the supplementary module may comprise first and second supplementary entities. The two supplementary entities may be distinct. In the first supplementary entity, main supplementary applications may be implemented. In the second supplementary entity, at least one auxiliary supplementary application may be implemented.

The data management system may comprise a data exchange interface between the securing entity and one of first and second supplementary entities.

An aspect of the present invention may be directed to a method for managing a data transmission on an aircraft, e.g., between a flight management system of an avionics type and a portable electronic device of an open world type. The method may comprise a monitoring step of automatically monitoring the data to be transmitted, and an authorization managing step of automatically managing, based on the monitoring, an authorization to transmit data via the data link between a flight management system and the portable electronic device.

The monitoring step may comprise a first condition checking step of checking whether any of the following first conditions is fulfilled: data to be transmitted is incorrect; the aircraft is in a phase, for which the data concerned are not expected; and a time greater than a predetermined time value has elapsed since a request was sent. If at least one of the first conditions is fulfilled, the authorization managing step may comprise a transmission preventing step of preventing the transmission of data between the flight management system and the portable electronic device.

The monitoring step may further comprise a second condition checking step of checking whether at least one second condition is fulfilled. If at least one second condition is fulfilled, the authorization managing step may comprise sending an alert.

The method may further comprise a step of presenting values to an operator (e.g., a crew member), and a step in which the data transmission is performed only when the presented values are validated by the operator (the crew member).

DESCRIPTION OF THE DRAWINGS

The features of the invention mentions above and below, as well as others, will appear more clearly on reading the following description of examples of embodiments, the description being given with reference to the attached figures. In these figures, identical references designate similar elements.

DETAILED DESCRIPTION

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium—transitory and/or non-transitory—and executed by a computer or processor, whether or not such computer or processor is explicitly shown.

The present description is given with reference to an avionic system that includes a flight management system (referred to as "FMS" in aeronautical language) and an airport navigation system of an aircraft. However, it will be understood that the principles described can be applied to any avionic system.

Below, the following standard specifications may be mentioned: ARINC653 (Avionics Application Standard Software Interface), IMA (Integrated Modular Avionics (part of ARINC653), AFDX (Avionics Full Duplex Switched Ethernet), ARINC429 (Digital Information Transfer System), and ARINC661 (Cockpit Display System). The contents are incorporated by reference in their entirety.

Figure 1:
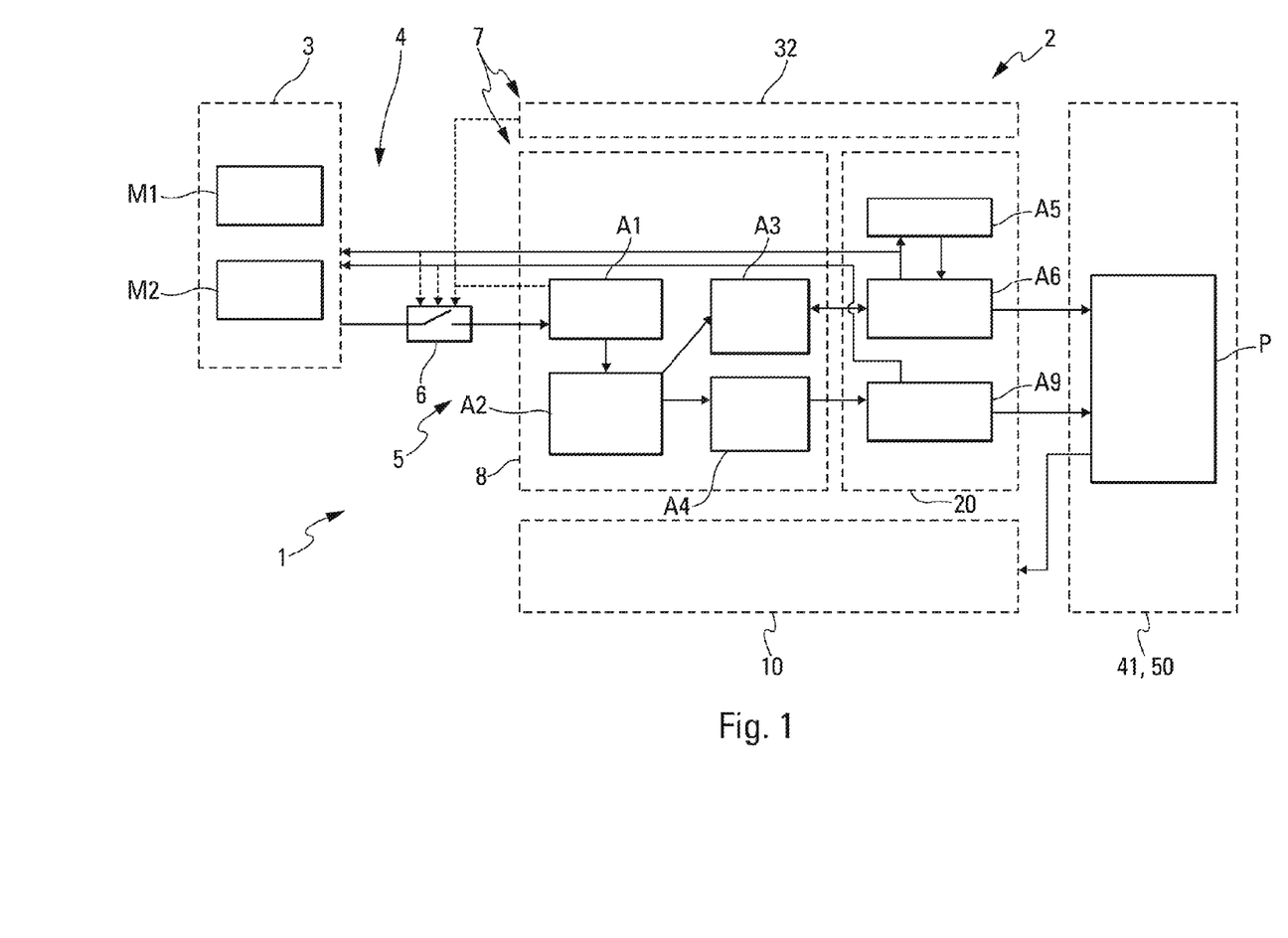
FIG. 1 is a block diagram of a data management system according to an embodiment of the present invention.

The example data management system 1 illustrated in FIG. 1 may be used for the management of a data transmission on an aircraft (not shown), e.g., a transport airplane. The data transmission may be between a flight management system 2 and a portable electronic device 3. The flight management system 2 may be of an avionics type. That is, the flight management system 2 may be secured in such a way to obey data constraints (e.g., of integrity and/or of availability). On the other hand, the portable electronic device 3 may be of an open world type. That is, it may be a device that is not sufficiently secured to enable integration in the aircraft. The portable electronic device (also referred to as electronic device) can be an electronic flight device of EFB (Electronic Flight Bag) type. More generically, the electronic device can be any portable computing device (e.g., touch tablet) that can be used to prepare a flight of the aircraft.

The data management system 1 may comprise a data link 4 and a data securing module (or unit) 5. The data link 4 may be configured to allow a transmission of data between the electronic device 3 and the flight management system 2. The data securing module 5 may be configured to automatically monitor the data to be transmitted between the electronic device 3 and the flight management system 2, i.e., monitor the data on the data link 4. The data securing module 5 may also be configured automatically manage an authorization to transmit data between the flight management system 2 and the electronic device 3 based on the monitoring. In other words, depending on the data monitoring results, the data securing module 5 can control whether or not data can be exchanged between the flight management system 2 and the electronic device 3.

The data securing module 5 may comprise a switching element 6 whose operation may be externally controlled. The switching element 6, which may be hardware and/or software based, can be configured to be brought into one or the other of two different positions. When brought into a first position, the switching element 6 may prevent the transmission of data between the electronic device 3 and the flight management system 2 via the data link 4, i.e., the switching element 6 may disable the data link 4 when brought into the first position. When brought into a second position, the switching element 6 may allow the transmission of data via the data link 4, i.e., the switching element 6 may enable the data link 4 when brought into the second position. From a perspective, the switching element 6 may be viewed as being configured to be in one of at least two states—transmission enable state (corresponding to the first position) and transmission disable state (corresponding to the second position).

The data securing module 5 may also comprise a monitoring unit (or module) 7 configured to monitor the data to be exchanged between the electronic device 3 and the flight management system 2 so as to be able to detect an incorrect data flow. It may be worth noting that the data "to be exchanged" is monitored, i.e., the monitored data has not yet been transmitted to its destination. Preferably, the data transmission occurs only upon verifying the correctness of the data, which occurs through monitoring. More generally, the monitoring unit 7 may be configured to detect whether the monitored data is correct or incorrect data. The monitoring unit 7 may also be configured such that when incorrect data is detected, the monitoring unit 7 controls the switching element 6 to bring it to the first position to thereby prevent the transmission of the incorrect data between the electronic device 3 and the flight management system 2.

Incorrect data may be any of the following: an incorrect data flow, data which are not expected (for example in certain flight phases of the aircraft) and/or data to be transmitted after too long a time interval following a corresponding request. More broadly, incorrect data may be any unexpected data. An incorrect data may comprise an unexpected value, comprise a value outside of an expected range, be in an unexpected format, provided outside of an expected time range, etc.

As seen in FIG. 1, the monitoring unit 7 is illustrated to comprise a monitoring partition 32. In an ARINC653 context, a partition may include software (e.g., set of code lines) which can be executed in a defined timeslot, segregated from execution time slots of other partitions (temporal segregation) so that activities in one partition do not affect timing of activities of another partition. The partitions can also be spatially segregated from each other (generally a memory space or input/output space) so as to prevent one partition from accessing a memory space of another partition. The monitoring partition 32 will be further described below.

Also as seen in FIG. 1, the data management system 1 may further comprise a securing entity 8. In this context, an entity may be viewed as a partition or a logic component of a partition. A logic component may include a set of coherent codes from a functional and/or software point of view. The code may be stored in a memory of the partition. One logic component may be able to share common resources with one or more other components of the same partition. A partition can host several components. This means that the securing entity 8 may host one or more logic components, i.e., can implement one or several applications. This means that the monitoring partition 32 may also host one or more logic components, i.e., implement one or several application. The securing entity 8 may comprise one or more applications (A1-A4 illustrated in FIG. 1). At least one application (e.g., A1) may be an application of the monitoring unit 7. Also at least one application may be a supplementary security application, as described hereinbelow.

Thus, the example data management system 1 is able to transmit (or transfer) automatically and securely (by virtue of the data securing module 5) data between the electronic device 3 (an EFB device) and the flight management system 2 of the aircraft, which preferably belong to two well segregated worlds (modules) of the aircraft. This can reduce the workload of the crew, and thus enable the crew to save time when preparing the aircraft, while being more effective (e.g., by preventing input errors, etc.).

Figure 2:
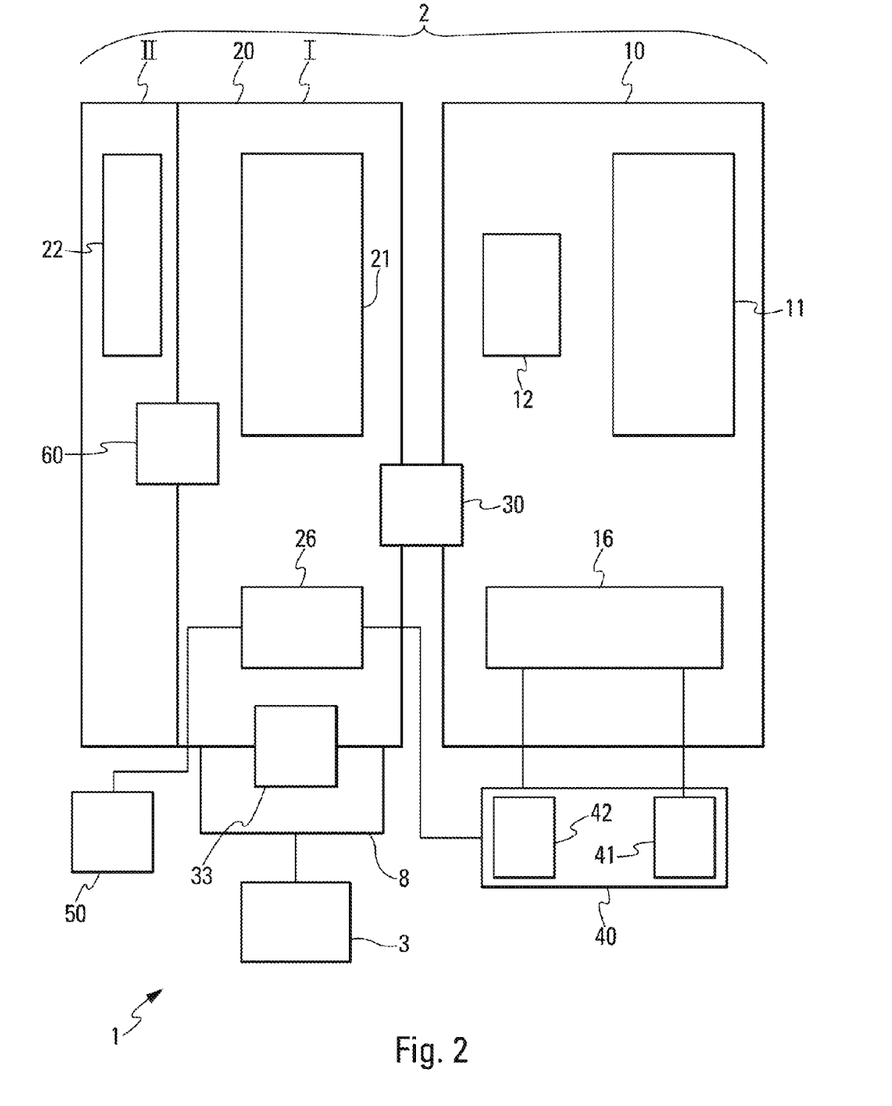
FIG. 2 is an example embodiment of a data transmission system of the present invention comprising a flight management system provided with a core module and a dual-entity supplementary module.

In a preferred embodiment, the flight management system 2 comprises, as illustrated in FIG. 2, a core (or standard) module 10 and a supplementary (or specific) module 20. The core module 10 and the supplementary module 20 may be hosted on the same IMA equipment item or on two different IMA equipment items. Each IMA equipment (in conformity with the ARINC653) may comprise devices such as an arithmetic unit, memory, physical interfaces with various devices of the aircraft and/or with other hardware equipment as well as an operating system configured to manage the partitions (described below) hosted on that IMA equipment in such a way that the IMA equipment is capable of executing the applications associated with each of the hosted partitions. This means that the partitions and/or the applications of the partitions may be implemented in hardware or in a combination of hardware and software.

The supplementary module 20 may comprise two separate entities, a first entity I comprising main supplementary applications and a second entity II comprising auxiliary supplementary applications. The first entity I may also be referred to as a main (or principal) supplementary entity, and the second entity II may be referred to as an auxiliary supplementary entity. For ease of reading, the phrases "main supplementary" and "auxiliary supplementary" may be respectively shortened to "main" and "auxiliary" in the context of main and auxiliary supplementary entities or partitions. Note that the main and/or the auxiliary entity may each host one or more logic components, i.e., may implement one or more applications.

The main and auxiliary entities I and II being situated or hosted on the same IMA equipment item or on different IMA equipment items. In either circumstance, the two entities may be viewed as being separate. In the descriptions of embodiments provided below, it may be assumed that the main and auxiliary entities are hosted on the same IMA equipment unless explicitly indicated otherwise. The securing entity 8 may be situated on the same equipment item as the core module or on the same equipment item as the supplementary module.

Referring back to FIG. 1, it is preferred that the switching element 6 (hardware or software) be situated external to the flight management system 2 in a separate equipment item (e.g., different hardware element). Such a setup makes it possible to block the data transmitted from the electronic device 3 before they arrive at the flight management system 2 in the core module 10 or in the supplementary module 20. In a less preferential variant, the software switching element 6 can be implemented in the supplementary module 20. It is also possible to implement the software switching element 6 in the core module 10 of the flight management system 2.

The monitoring unit 7 may comprise a data acquisition functionality, and the monitoring partition 32. The monitoring partition 32 may be configured to monitor the CPU use of the partition on which the securing entity 8 is hosted. In this way, the monitoring partition 32 may detect a CPU overload in the event of a malicious attack.

A functionality may be hosted on a partition (e.g., the securing partition 8 and/or the monitoring partition 32) which is distinct from the main and auxiliary partitions of the supplementary module 20, and the partition may be situated on the same IMA equipment item as the two entities of the supplementary module 20 or on a different IMA equipment item. In the case where the partition is situated on a different equipment item, communication by one or more AFDX (Avionics Full Duplex Switched Ethernet) links may be provided with the other IMA equipment items. Preferably, the monitoring partition 32 has limited memory and CPU resources to so as reduce its impact on the specific module.

In a preferred variant, the securing entity 8 may be situated on the same IMA equipment item as the main and the auxiliary entities I and II of the supplementary module 20. As an alternative, the securing entity 8 can be situated on the same IMA equipment item as the core module 10.

Note that the securing entity 8 may comprise a plurality of security applications (A1-A4 in FIG. 1). Also note that the data link 4 between the electronic device 3 and the flight management system 2 may pass through the securing entity 8. In an embodiment, the data link 4 may be implemented as a bus of an A429 (Digital Information Transfer System) or an Ethernet type.

In the embodiment illustrated in FIG. 2, the data management system 1 can comprise a data exchange interface 33 between the securing entity 8 and the main entity I (comprising the main supplementary applications) of the supplementary module 20. This data exchange interface 33 may be configured to manage the communication between the securing entity 8 and the main entity I of the supplementary module 20. Through the exchange interface 33, any or all main applications of the main entity I may communicate with any or all security applications of the securing entity 8.

As indicated, the switching element 6 can be a hardware switching element. An example of a hardware switching element is transistor, which can be driven by the monitoring unit 7 and/or one or more security applications which make it possible to isolate the two equipment items. The switching element 6 can also be of a software switching element. Such a switching element can be a program or application which automatically cuts the link when a particular condition is detected, for example an incorrect data flow, an erroneous format, etc. The switching element 6 (software or hardware) makes it possible to cut the exchange of information between the electronic device 3 and the flight management system 2. The switching element 6 can be activated following the detection of incorrect data flow, or in certain flight phases where the data are not expected, or even after too long a time interval following a data request, as specified hereinbelow. The switching element 6 can be driven or otherwise controlled by the monitoring unit 7.

As indicated above, in a preferred embodiment, the flight management system 2, which can be of an avionics type, as illustrated in FIG. 2, may have an architecture comprising the core module 10 (or standard module (or part)) and the supplementary module 20. The core module 10 and the supplementary module 20 may be linked together by a data exchange interface 30. That is, the core and the supplementary modules 10, 20 may communicate with each other through the exchange interface 30. So as to minimize confusion, the exchange interfaces 30 will also be referred to as the first exchange interfaces and the exchange interface 33 between the main entity I of the supplementary module 20 and the securing entity 8 will also be referred to as the second exchange interface.

The core module 10 may comprise a set (one or more) 11 of core applications, also referred to as generic applications. In an embodiment, each generic application 11 may be implemented through a corresponding core element. It may then be said that the core module 10 comprises a set of core elements. The execution of each of the generic applications 11 may implement a generic/core functionality related to a management of the flight of an aircraft (e.g., flight plan management, fuel management, etc.). The generic functionalities may be either generic basic functions of the flight management system, or provide functional services that are also generic to the flight management system.

The supplementary module 20 may comprise a set (one or more) 21 of main supplementary applications, or simply main applications 21. The supplementary module 20 may also comprise a set (one or more) 22 of auxiliary supplementary applications, or simply auxiliary applications 22. Each auxiliary application 22 can be accessed by one or more main applications 21. Each main application 21 may be implemented through a corresponding main element and/or each auxiliary application 22 may be implemented through a corresponding auxiliary element. It may then be said that the supplementary module 20 comprises main elements and/or auxiliary elements. Also, each auxiliary element may be accessed by one or more main elements.

Each of the supplementary applications, main 21 or auxiliary 22, may be specific to an entity to which the aircraft belongs, such as a specific aircraft model, an aircraft family, an airline, an alliance, or all or part of a fleet. Each auxiliary application may comprise one or more algorithms, e.g., executable on a computing device. Preferably, the only aim of an execution of an auxiliary application is to provide computation results to each of one or more main applications accessing that auxiliary application.

The execution of each of the main applications may implement a corresponding supplementary functionality of the supplementary module 20. The supplementary functionalities may be new functions compared to the generic functions of the core module 10 (e.g., functions not provided through the core module 10), or alternative functions to the generic functions of the core module 10 to which they provide behavioral modifications, or even provide supplementary services so as to supplement the services of the core module 10 which use one or more of these supplementary functionalities.

The set 21 of main applications may be implemented in the first (main) entity I and the set 22 of auxiliary applications may be implemented in the second (auxiliary) entity II distinct from the first. As alluded to above, an entity may be viewed as a partition or a logic component of a partition. A logic component may include a set of lines of code that are consistent from a functional or logical point of view. The code may be stored in a memory of the partition. A logic component may be able to share common resources with one or more other components of the same partition. A partition can host several components. This means that the main and/or the auxiliary entity may each host one or more logic components.

Preferably, the main applications 21 and the auxiliary applications 22 of the supplementary module 20 are respectively implemented in the main and auxiliary partitions I, II (in accordance with ARINC653) hosted on one and the same IMA equipment item. The main and auxiliary partitions of the supplementary module 20 are preferably distinct from one another and also distinct from the partition bearing the generic functionalities relating to the set 11 of the core module 10. The supplementary module 20 may further comprise a data exchange interface 60, provided between the two partitions I and II. In this way, any or all main applications 21 may communicate with any or all auxiliary applications 22 via the exchange interface 60, also referred to as the third exchange interface.

The core module 10 may furthermore include a core interface 16 accessible by any or all generic applications 11. The core interface 16 may be configured to interface with an embedded (or on-board) system 40 to thereby allow the core module 10 to communicate with the embedded system 40 of the aircraft. The embedded system 40 may comprise at least one generic human/machine interface 41. The embedded systems 40 can also comprise embedded devices 42 such as those routinely installed in an aircraft, such as, flight instruments, sensors, etc. Thus, through the core interface 16, any or all generic applications 11 may communicate with the generic man-machine interface 41 and/or with any or all embedded devices 42. In an embodiment, the core interface 16 may be provided as a generic interfacing application which, when executed, implements a core interfacing functionality that allows the core module 10 to interface with the embedded system 40.

Note that any or all generic applications 11 of the core module 10 and any or all main applications 21 of the main entity I may communicate with each other through the first exchange interface 30. The main applications 21 can, via the first exchange interface 30 and via the core interface 16, communicate with the generic human/machine interface 41 and/or with the embedded devices 42.

The supplementary module 20 may include a supplementary interface 26 accessible by any or all of the other main applications 21. In FIG. 2, the supplementary interface 26 is illustrated as being part of the main partition I of the supplementary module 20. The supplementary interface 26 may be configured to interface with the first exchange interface 30. In this way, the supplementary module 20 may communicate with the generic human/machine interface 41 via the first exchange interface 30 and the core interface 16. That is, any or all main applications 21 may communicate with the generic human/machine interface 41 and/or any or all embedded devices 42.

Alternatively or in addition thereto, the supplementary interface 26 may be configured to interface with the generic human/machine interface 41. In this way, the supplementary interface 26 can allow the main applications 21 to communicate directly with the embedded system 40 (with the generic human-machine interface 41 and/or the embedded devices 42) without having to go through the core module 10 via the first exchange interface 30. Also alternatively or in addition thereto, the supplementary interface 26 may be configured to interface with a specific human/machine interface 50 specific to the supplementary module 20. In this way, the principal interface 26 can allow any or all main applications 21 to communicate with the specific human-machine interface 50.

In an embodiment, the supplementary interface 26 may be provided as a supplementary interfacing application which, when executed, implements a supplementary interfacing functionality that allows the supplementary module 20 to interface with the specific man-machine interface 50, the first exchange interface 30 and/or the embedded system 40 (the generic human-machine interface 41 and/or the embedded device(s) 42).

Each human/machine interface 41, 50 may comprise one or more of screens (wide, touch, etc.), keyboards, mice, tracker balls, head-up display systems, augmented reality systems, etc., and is configured to allow the crew to enter data. The core module 10 can comprise, furthermore, a set 12 of elements, configured to implement functionalities such as a database or a maintenance functionality.

By virtue of this structure with two distinct modules, the supplementary functionalities of the supplementary module 20 may be incorporated in the flight management system 2 without requiring any modification of the elements of the core module 10 and, because of this, use only the functions and functional services thereof that it offers (in this case the generic functionalities of a flight management system). Also, these supplementary functionalities can be developed independently of the core module 10. Furthermore, the architecture of the supplementary module 20 on two distinct entities I and II makes it possible to update independently and at different software levels, these two entities of the supplementary module 20. Thus, supplementary functionalities of the supplementary module 20 can be modified simply via the modification of the algorithms of the auxiliary applications 22. Modifying the main applications 21 may not always be necessary, i.e., the main partition I may be left unmodified in some instances. This gives the supplementary module 20 a greater industrial flexibility.

Referring back to FIG. 1, the securing entity 8 may comprise any one or more of the following security applications:

incorrect data flow detection application A1. In an embodiment of the data management system 1, a dedicated partition may be used, and all the data may be acquired as they come, by storing them, and they may be processed in the order of arrival, so that, if the sender does not observe a delay allotted between two transmittals, the second datum need not be taken into account. Thus, in case of flooding, all the CPU time will likely be used on these acquisitions, thus provoking a CPU overload which will be able to be detected by the monitoring partition 32;

data consistency and format checking application A2. This application A2 may be configured to compare an expected format of the data with the actual format of the data, based on the category of the data concerned. The application A2 may be configured to check on data that have variable content, size, and/or range such as flight plan data and wind/temperature data. The expected format of the data may be coded in application, to prevent a malicious person from being able to circumvent the protection. The application A2 may behave as a filter by rejecting data that are not in the expected format or in the expected range to prevent such data from being inserted into the flight management system 2;

input data check application A3. This application A3 may be configured to check the consistency of the input data between the start and the end of the transmission; and encryption/decryption application A4. For example, the application A4 may be configured to implement a standard method for computing a value (CRC) dependent on the datum considered. The sender and the receiver may apply a same algorithm to compute this value, and if the datum is sent with its CRC code, the receiver can decode the datum, recompute the CRC code and compare the computed value with that received from the sender. The decryption portion of the application A4 makes it possible to check that the data have not been corrupted during the transfer of information. Note that the application A4 need not check whether the data were valid at the source.

Example implementations of operations (not exhaustive) of the data management system 1 are described hereinbelow: The first exemplary implementation (or first application) relates to managing the transmission of performance computation results at low speed (e.g., takeoff, landing), and is explained with reference to FIG. 3. The second exemplary implementation (or second application) relates to managing the transmission of a flight plan, and is explained with reference to FIG. 4. These examples are presented assuming that the data management system 1 illustrated in FIG. 1 is being operated. In the examples, it may be assumed that the switching element 6 is a hardware switching element. Moreover, it may be assumed that the switching element 6 is situated external the flight management system 2 (which is preferred). This means that the electronic equipment 3 can be isolated from flight management system 2 by the switching element 6.

Figure 3:
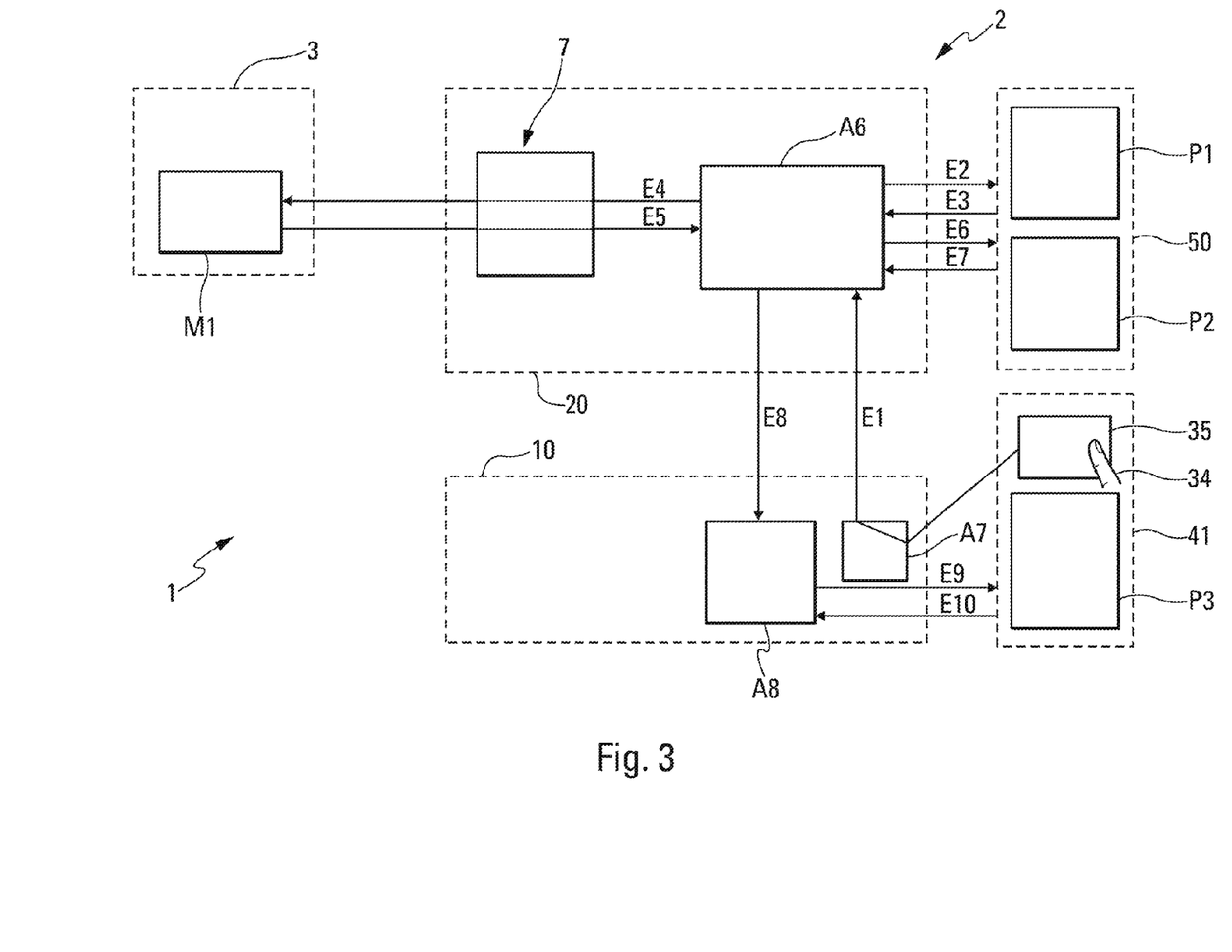
FIGS. 3 and 4 schematically illustrate use of the data management system of FIG. 1 to implement two different examples of data transmission management.
Figure 4:
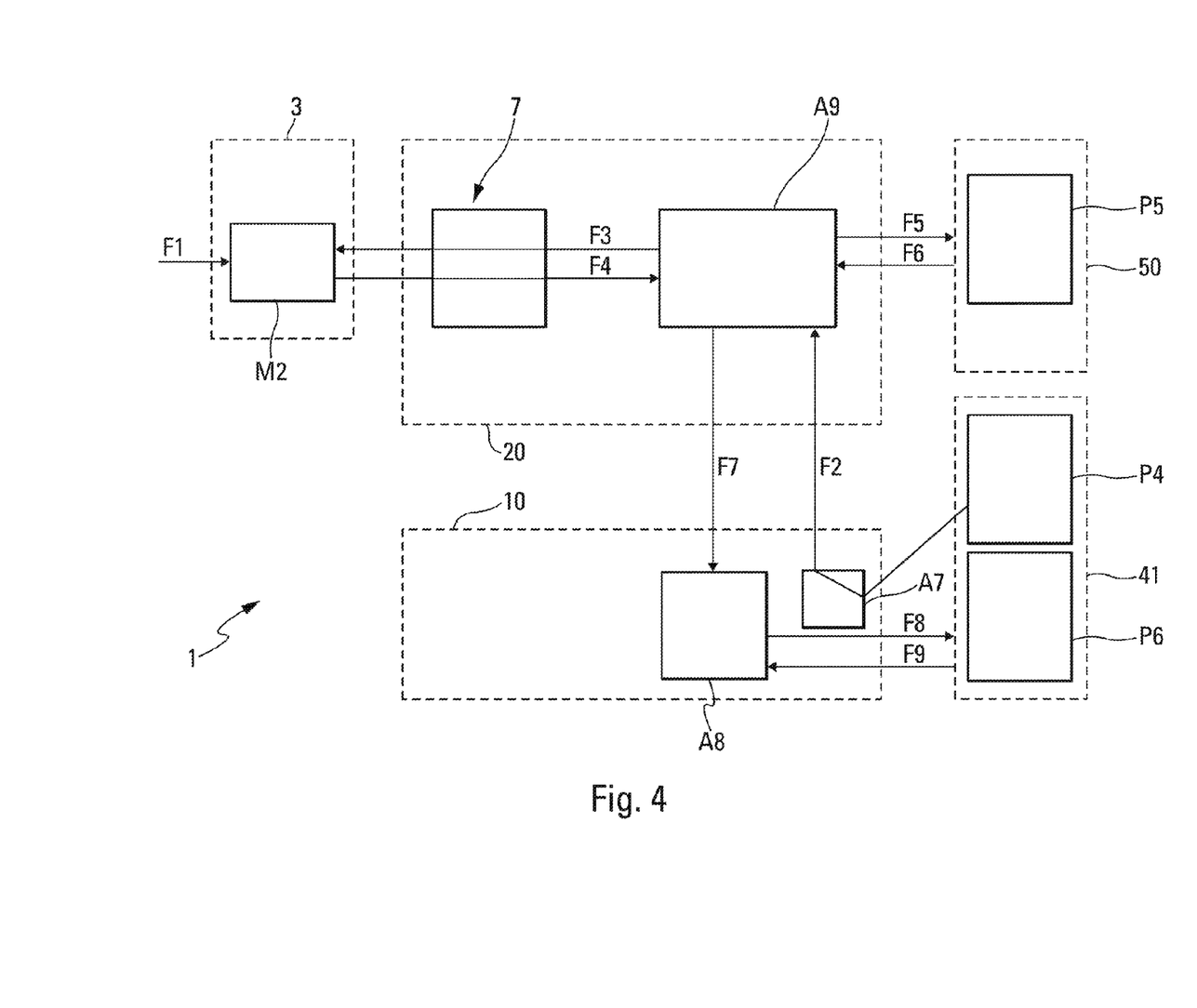

Although not necessarily illustrated in FIGS. 3 and 4, it may be preferred that the securing entity 8 be in a separate partition (see FIG. 1) and be linked with the supplementary module 20 via the second exchange interface 33 (see FIG. 2). FIG. 1 shows the security applications used in the example operations. They are:
- the incorrect data flow detection application A1 (applicable to both FIGS. 3 and 4);
- the consistency and format checking application A2 (applicable to both FIGS. 3 and 4);
- the application A3 for checking the consistency of the input data between the start and the end of the transmission (applicable to FIG. 3); and
- the data encryption/decryption application A4 (applicable to zero, one or both of FIGS. 3 and 4).

The first exemplary implementation relates to management of data related to low speed performance computations (take-off, landing). Conventional flight management systems do not currently take into account such data. These computations may be performed by an application of the airline and/or of the ground crew, which is hosted in the electronic device 3. These computations are performed when preparing the flight, based on parameters such as the wind and the weight of the aircraft, which are entered into the electronic device 3 by an operator, e.g., a crew member such as the pilot. Conventionally, the results of these computations are then manually entered by the pilots into the flight management system, via a human/machine interface during the preparation of the flight.

In this first exemplary implementation, the electronic device 3 may comprise a computation module M1 configured to perform the low speed performance computations. Unlike the conventional system, the securing entity 8 of the first example implementation may comprise a component configured to implement the input data check application A3. The application A3 may compare the data sent to the computation module M1 of the electronic device 3 with these same data returned by the computation module M1 after computation, to check that the data have not been corrupted between the flight management system 2 and the electronic device 3 and that the computation has indeed been carried out with the correct data.

The supplementary module 20 may further comprise a component configured to implement a computation application A5 (see FIG. 1) which will be detailed below. The computation application A5 may be an auxiliary application. A request (message to RAM or memory sharing port) launched by a main application A6 relating to the human/machine interface may be addressed both to the application A5 and to the module M1. The human/machine interface on which the validation is performed can be either the specific human/machine interface 50, or the generic human/machine interface 41 (a page P of which is represented by way of illustration in FIG. 1).

In this first exemplary implementation, the computations may be implemented in the supplementary module 20 and in the electronic device 3, which may be considered to be an external computer. The data to be transmitted may be the results of the computations of the module M1 of the electronic device 3. These M1 computed data may comprise take-off data and landing data.

The take-off data may comprise any one or more of:
- data to be loaded into the flight management system 2 (e.g., take-off speed, engine configuration, aerodynamic configuration, acceleration, altitude);
- secondary results of information from the crew (e.g., complementary data supplied by the module M1 and not used by the flight management system 2). These data can be displayed, e.g., on the specific human/machine interface 50; and
- computation input for verification.

The landing data may comprise any one or more of:
- results that loaded into the flight management system 2 (e.g., approach speed, aerodynamic configuration);
- secondary results of information from the crew; and
- computation input for verification.

Generally, these data may be transmitted two to four times during the preparation of the flight (take-off data, and possibly landing data) and one or two times during the flight (landing data).

The monitoring unit (or module) 7 may activate the switching element 6 (to allow the transmission of data) upon reception of a computation request from the crew (e.g., received via the specific human/machine interface 50), and may transmit the request to the module M1 in the electronic device 3. The switching element 6 may remain activated for a given duration, or may remain activated as long as the response to the request has not been received and the aircraft is not in flight (except for the landing data). Similarly, the monitoring unit 7 can block the transmission by controlling the switching element 6, if the monitoring unit 7 detects an incorrect data format or a data flow that is abnormal to what is expected.

In the first exemplary implementation, application A5 may compute some or all of the take-off and/or landing data that the module M1 computes, but may do so using a relatively simplified computation algorithm. This makes it possible to check (e.g., by the application A3) the consistency of the computation supplied by the module M1. While the computation of the application A5 is less accurate than the computation of the module M1, the application A5 computations can nonetheless be used to generate an alert in the event of a significant difference.

Furthermore, the application A2 can check the volume and the format of the data against what is expected (integer, character, etc.), and the application A1 can monitor the data rate (rate of use of the CPU). The first exemplary implementation (or first application) can have the following successive steps E1 to E10 as illustrated in FIG. 3:
- E1—the crew uses the generic human/machine interface 41 (e.g., associated with an application A7), as illustrated by a finger 34 acting on an interface element 35, to request the application A6 of the supplementary module 20 to display the corresponding specific page P1;
- E2—the page P1 is displayed on the specific human/machine interface 50 (e.g., by the application A6);
- E3—the crew checks, and if necessary adjusts, the data that will be used for the computation, and initiate the computation using the specific human/machine interface 50;
- E4—the application A6 sends a request to the computation module M1 hosted in the electronic device 3 and closes the switching element 6 (on its own or by requesting the monitoring unit 7 to close it). This request includes all the data, reviewed and possibly adjusted by the crew, which are necessary for the computation. The computation module M1 in the electronic device 3 receives these data and (usually) performs the corresponding low speed performance computations;

E5—the results of the computations made by the module M1, as well as the input data, are sent to the application A6 via the switching element 6 and the monitoring unit 7.

In this case, if at least one of the following conditions is fulfilled, the monitoring unit 7 may reject the data and/or control the switching element 6 to block the transmission. A message can be provided in return to the electronic device 3 to ask for a repeat transmittal. The checked conditions may include any one or more of: no response is received within an allotted time; the aircraft takes off (for the take-off data only); and the data format/range or flow does not conform to what is expected.

If the format/volume or the flow is correct, but the input data returned by the module M1 do not correspond to those which were sent with the request, an alert may be emitted (e.g., by the monitoring unit 7 and/or the application A6) to indicate to the crew that the results do not necessarily correspond to what is expected, due to a transmission error. If the results are not consistent with the computations performed by the application A5, an alert may also be emitted (e.g., by the monitoring unit 7 and/or the application A6) to warn the crew.

E6—the results are displayed (e.g., by the application A6) on a page P2 on the specific human/machine interface 50 for validation by the pilot;

E7—the pilot uses the specific human/machine interface 50 to request that the values to be sent once they are validated to the flight management system 2;

E8—the values are taken into account by a flight plan application A8;

E9—the new data are displayed on a page P3 on the generic human/machine interface 41 (e.g., by the application A8); and E10—the pilot confirms the new data using the standard human/machine interface 41. This step E10 is optional.

The second exemplary implementation relates to management of data in the transmission of a flight plan such as a computerized flight plan (CFP). In this second exemplary implementation, the electronic device 3 may be considered as a database.

Conventionally, the airline supplies the flight plan to the pilot and/or to the ground crew to prepare the aircraft before the flight. The flight plan is loaded into the electronic device 3 (via a diskette, a USB key or by wifi for example) before the flight, then is manually entered during the preparation of the flight into the flight management system via a human/machine interface. No computation is performed, since all the data are stored in a memory M2 of the electronic device 3.

But in this second implementation, any one or more of the following data contained in the electronic device 3 may be transmitted:

the initial flight data (e.g., departure airport, flight number, date, estimated take-off time);

the fuel schedule and/or the weight of the aircraft;

the flight plan (e.g., a sequence of procedures, corridors, waypoints, etc.); and the wind and/or the temperature along the flight plan.

Generally these data are entered one or two times during the preparation of the flight. This second exemplary implementation can include the following successive steps F1 to F9 as illustrated in FIG. 4:

F1—an operator of the airline or a crew member of the aircraft enters at least some of the abovementioned data into the electronic device 3 during the preparation of the flight;

F2—a crew member uses the standard human/machine interface 41 (page P4) to request an application A9 (configured to load a computerized flight plan CFP) of the supplementary module 20 of the flight management system 2 to send a request to the electronic device 3;

F3—the application A9 sends the request to the electronic device 3 and closes the switching element 6 to allow the transmission (on its own or by requesting the monitoring unit 7 to close it);

F4—the electronic device 3 sends the data from the memory M2 to the application A9, via the switching element 6 and the monitoring unit 7.

In this case, if at least one of the following conditions is fulfilled, the monitoring unit 7 may reject the data and/or control the switching element 6 to block the transmission. A message can be provided in return to the electronic device 3 to ask for a repeat transmittal. The checked conditions may include any one or more of: no response is received within an allotted time; the airplane is taking off; and the data format/range or flow does not conform to what is expected.

F5—the results are displayed (e.g., by the application A9) on the specific human/machine interface 50 (page P5) for validation by the pilot;

F6—the pilot decides (e.g., after validating) to send the values to the flight management system 2 for the values to be taken into account and displayed, e.g., on the generic human/machine interface 41;

F7—the values are transmitted (e.g., by the application A9) to the flight plan application A8 for them to be integrated in a flight plan, e.g., in a secondary flight plan;

F8—the data of the secondary flight plan are displayed (e.g., by the application A8) on the standard human/machine interface 41 (page P6); and F9—the pilot confirms the new data using this generic human/machine interface 41 so as to activate the secondary flight plan.

In a variant of the first embodiment, the applications A2, A3 and A4 may be implemented in the supplementary module 20 and/or the core module 10, instead of in the securing entity 8. In another variant of the first embodiment, a manual switch may be implemented on the data link 4 between the flight management system 2 and the electronic device 3, in order for the pilot(s) to be able to cut the link manually upon the detection of a particular condition.

In a second embodiment of the invention, the switching element 6 is preferably situated outside the flight management system 2 in a separate equipment item. This makes it possible to block the data before they arrive at the supplementary module 20. In a less preferential variant, a software switching element 6 may be implemented in the supplementary module 20. Also in the second embodiment, the monitoring unit (or module) 7, comprising at least the incorrect data flow detection application A1 (e.g., as a main application). This application can be hosted in the securing entity 8 if the data management system 1 comprises such securing entity. The incorrect data flow detection application A1 may be configured to limit the depth of acquisition of the data and control its flow so as to disregard the data which do not correspond to the expected flow.

In a particular variant of this second embodiment, the data management system 1 may include the securing entity 8, which in turn may comprise a plurality of security applications as specified above. The security applications may be implemented as main applications of the main entity I of the supplementary module 20.

In this second embodiment of the data management system 1, concerning the incorrect data flow detection application A1, situated on the same partition as the other functionalities of the flight management system 2, the depth of the reception ports may be limited, at the application level, to 1 and the data acquisition period may be controlled. This may cause data to be disregarded frequently, by devoting only limited time to the acquisitions.

The data management system 1, as described above, offers the advantages (not exhaustive) indicated below. The securing entity 8 can be implemented in an entity different from the main and auxiliary entities I and II of the supplementary module 20, with CPU/memory resources that are restricted and monitored, in order to have no impact on their functions. Thus, the segregation of the security applications from the other applications of the flight management system 2 effectively protects the flight management system 2 against the introduction of a malicious code into the flight management system 2 or the introduction of incorrect data.

A data flow transmission can be blocked upstream of the flight management system 2 (by the switching element 6), if the incorrect data flow detection application A1 detects a problem or if the monitoring unit 7 detects overactive partitions.

In the securing entity 8, the other security applications make it possible to block the transmission of incorrect data to the supplementary module 20, that is to say data that are invalid or inconsistent (functionally) are blocked. The data blocked automatically through the entity 8 and/or the security application may or may not be the totality of detected invalid data. Some data may be detected upon validation by the pilot.

The data management system 1 makes it possible to avoid flooding or cutting the link, when no data transmission is provided, which makes it possible to safeguard the flight management system 2 against any attack or undesirable data transfer. In effect, the link for the data transmission between the electronic device 3 and the flight management system 2 may be made available only when necessary, and unavailable for the rest of the time, in order to avoid undesirable data transmissions to the flight management system 2 during the flight.

Moreover, the switching element 6 makes it possible to authorize the transmission of data during a short time period. It provides the capability to block the transmission of data after this short time period or when the response expected from the electronic device 3 has been received (the data can no longer be transmitted, and are not yet in buffer memory); and to block the transmission in the case of the reception of an incorrect frame from the electronic device 3 or when the monitoring unit 7 detects an abnormal CPU usage (which can correspond to the reception of an unexpected large quantity of data).

The link between the electronic device 3 and the flight management system 2 can be made via the securing entity 8 which acts as a buffer zone.

While at least one exemplary embodiment of the present invention has been shown and described, it should be understood that modifications, substitutions and alternatives may be apparent to one of ordinary skill in the art and can be made without departing from the scope of the invention described herein. This application is intended to cover any adaptations or variations of the specific embodiments discussed herein. In addition, in this application, the terms "comprise" or "comprising" do not exclude other elements or steps, the terms "a" or "one" do not exclude a plural number and the term "or" means either or both. Furthermore, characteristics or steps which have been described with reference to one of the above exemplary embodiments may also be used in combination with other characteristics or steps of other exemplary embodiments described above.

The invention claimed is:

1. A data management system for an aircraft, the data management system comprising:
   a flight management system, of an avionics type;
   at least one portable electronic device, of an open world type;
   a data link configured to allow a transmission of data between the portable electronic device and the flight management system;
   a data securing module configured to:
      automatically monitor the data to be transmitted from the portable electronic device to the flight management system, and
      automatically enable or disable data transmission between the flight management system and the portable electronic device based on the monitoring; and
   a switching element configured to be brought alternatively into a first state in which the transmission of data between the portable electronic device and the flight management system via the data link is disabled such that no data is allowed to be transmitted from the portable electronic device to the flight management system, or a second state in which the transmission of data between the portable electronic device and the flight management system via the data link is enabled.

2. The data management system as claimed in claim 1, wherein the data securing module comprises:
   a monitoring unit comprising at least one security application A1, the security application A1 being configured to monitor data so as to be able to detect incorrect data, the monitoring unit being configured to control the switching element in such a way as to be brought into the first state when the incorrect data is detected by the security application A1.

3. The data management system as claimed in claim 2, wherein the flight management system comprises a core module and a supplementary module.

4. The data management system as claimed in claim 3, further comprising:
   a securing entity, the securing entity comprising at least the security application A1 of the monitoring unit and at least one supplementary security application A2 to A4, and the securing entity being situated on a same equipment as the core module or supplementary module.

5. The data management system as claimed in claim 4, wherein the securing entity comprises at least one of the following security applications:
   an incorrect data flow detection application A1;
   a data consistency and format checking application A2;
   an input checking application A3; or
   a data encryption/decryption application A4.

6. The data management system as claimed claim 4, wherein the supplementary module comprises:

a main entity I in which main supplementary applications are implemented; and an auxiliary entity II in which at least one auxiliary supplementary application is implemented, and wherein the data management system further comprises a first exchange interface between the securing entity and one of the main entity I or auxiliary entity II of the supplementary module.

7. The data management system as claimed in claim 2, wherein the monitoring unit comprises:

a data acquisition unit; and a monitoring partition.

8. The data management system as claimed in claim 1, wherein the switching element is of one of the following types:

hardware type; or software type.

9. A method for managing a data transmission on an aircraft between a flight management system of an avionics type and a portable electronic device of an open world type, the method comprising:

automatically monitoring data to be transmitted between the flight management system and the portable electronic device; and automatically enabling or disabling, based on the monitoring, data transmission via a data link between the flight management system and the portable electronic device, wherein the data transmission between the flight management system and the portable electronic device is disabled or enabled by a switching element, the switching element being configured to be brought alternatively into a first state in which the transmission of data between the portable electronic device and the flight management system is disabled such that no data is allowed to be transmitted between the flight management system and the portable electronic device, or a second state in which the transmission of data between the portable electronic device and the flight management system is enabled.

10. The method as claimed in claim 9, wherein the monitoring step comprises checking whether one of the following first conditions is fulfilled:

a data flow to be transmitted is incorrect;

the aircraft is in a flight phase, for which the data concerned are not expected; or a time greater than a predetermined time value has elapsed since a request was sent, and wherein if at least one of these first conditions is fulfilled, the transmission of data between the flight management system and the portable electronic device is disabled.

11. The method as claimed in claim 9, wherein the monitoring step comprises checking also whether at least one second condition is fulfilled, and wherein if this second condition is fulfilled, the method further comprises sending an alert.

12. The method as claimed in claim 9, further comprising:

presenting values to a crew member; and requesting validation, wherein the data transmission is performed only when the crew member validates the values.

13. A data securing system for controlling data transmission between a flight management system of an aircraft and a portable electronic device, the data securing system being configured to:

automatically monitor the data to be transmitted from the portable electronic device to the flight management system to detect unexpected data, and automatically enable or disable data transmission between the flight management system and the portable electronic device based on whether the unexpected data is detected, wherein the data securing system comprises a switching element configured to be brought alternatively into a first state in which the transmission of data between the portable electronic device and the flight management system is disabled such that no data is allowed to be transmitted from the portable electronic device to the flight management system, or a second state in which the transmission of data between the portable electronic device and the flight management system is enabled.

14. The data securing system as claimed in claim 13 further comprises:

a monitoring unit comprising at least one security application, the security application being configured to monitor data to check whether one of the following conditions is fulfilled:

a data flow to be transmitted is incorrect;

the aircraft is in a flight phase, for which the data concerned are not expected; or a time greater than a predetermined time value has elapsed since a request for data was sent, wherein the monitoring unit being configured to control the switching element in such a way as to be brought into the second state when at least one of these conditions is fulfilled.

15. The data securing system as claimed in claim 13, wherein the flight management system comprises a core module and a supplementary module.

16. The data securing system as claimed in claim 15, wherein the monitoring unit is situated on a same equipment as the core module or the supplementary module, and wherein the monitoring unit includes a monitoring partition, the monitoring partition is temporally or spatially segregated from other partitions.

17. The data securing system as claimed in claim 15, wherein the switching element is situated in an equipment separate from the core module or the supplementary module.

18. The data management system as claimed in claim 3, wherein the monitoring unit is situated on a same equipment as the core module or the supplementary module.

19. The data management system as claimed in claim 3, wherein the switching element is situated in an equipment separate from the core module or the supplementary module.

* * * * *